(12) United States Patent
Mathew

(10) Patent No.: US 10,955,253 B2
(45) Date of Patent: Mar. 23, 2021

(54) SYSTEM AND METHOD FOR AGGREGATING AND DISPLAYING TACTICAL, INTELLIGENCE, AND MILITARY GARRISON INFORMATION

(71) Applicant: Alex Mathew, Waltham, MA (US)

(72) Inventor: Alex Mathew, Waltham, MA (US)

( * ) Notice: Subject to any disclaimer, the term of this patent is extended or adjusted under 35 U.S.C. 154(b) by 157 days.

(21) Appl. No.: 15/980,861

(22) Filed: May 16, 2018

(65) Prior Publication Data

US 2019/0353492 A1 Nov. 21, 2019

(51) Int. Cl.
| | |
|---|---|
| *G01C 21/34* | (2006.01) |
| *G01C 21/36* | (2006.01) |
| *G06F 3/01* | (2006.01) |
| *G09G 5/377* | (2006.01) |
| *G09G 5/02* | (2006.01) |
| *G01C 21/20* | (2006.01) |

(52) U.S. Cl.
CPC ......... *G01C 21/3461* (2013.01); *G01C 21/20* (2013.01); *G01C 21/3415* (2013.01); *G01C 21/362* (2013.01); *G01C 21/365* (2013.01); *G01C 21/3623* (2013.01); *G01C 21/3676* (2013.01)

(58) Field of Classification Search
None
See application file for complete search history.

(56) References Cited

U.S. PATENT DOCUMENTS

| | | | | |
|---|---|---|---|---|
| 2011/0208416 A1* | 8/2011 | Speier | ............... | G01C 21/3461 701/532 |
| 2011/0246055 A1* | 10/2011 | Huck | ............... | G01C 21/3453 701/533 |
| 2011/0261067 A1* | 10/2011 | Trinko | ............... | G01C 21/3461 345/589 |
| 2012/0194419 A1* | 8/2012 | Osterhout | ............ | G02B 27/017 345/156 |
| 2013/0128004 A1* | 5/2013 | Rollin | ............... | H04N 13/344 348/47 |
| 2015/0330803 A1* | 11/2015 | Okuda | ............... | G01C 21/3691 701/487 |
| 2017/0059343 A1* | 3/2017 | Spinelli | ................. | G01C 21/20 |
| 2017/0123054 A1* | 5/2017 | Becker | ................. | G01S 7/4817 |
| 2017/0163888 A1* | 6/2017 | Norland | ............ | H04N 5/23293 |
| 2017/0221244 A1* | 8/2017 | Hiraga | ............... | H04N 5/23238 |

* cited by examiner

*Primary Examiner* — Adam D Tissot
*Assistant Examiner* — Laura E Linhardt
(74) *Attorney, Agent, or Firm* — Daniel M. Cohn; Howard M. Cohn

(57) ABSTRACT

Disclosed embodiments provide systems and methods for aggregating and displaying tactical information. Multiple navigation routes between a starting location and ending location are computed. Each route is evaluated on a variety of criteria, and a ranked list is presented to a user. Additional information, such as rendering a geographically specific notification, display of a virtual range card, and/or information pertaining to an air support operation may also be rendered. Embodiments further enable issuing of air support requests via a tactile user interface. In this way, pertinent information is rendered in a timely manner to battlefield and commanding personnel to enable effective decision-making.

15 Claims, 9 Drawing Sheets

SYSTEM AND METHOD FOR AGGREGATING AND DISPLAYING TACTICAL, INTELLIGENCE, AND MILITARY GARRISON INFORMATION

FIELD OF THE INVENTION

The present invention relates generally to computer systems, and more particularly, to systems and methods for aggregating and displaying tactical, intelligence, and military garrison information.

BACKGROUND

Large volumes of collected data (traditional, non-traditional, actionable intelligence, real-time battlefield) available have become overwhelming in regards to dissemination and appropriate means to make decisions with. How this data is collected and delivered has also been of issue. Inclement weather, terrain or geographical features has at times, disrupted these efforts to disseminate intelligence. Historically, data has been handwritten, analyzed and processed into electronic format for greater dissemination, or received directly into the Command Operation Center (COC) for the battlefield or rear echelon commanders to make a decision or Course of Action (COA). This process lags the operational tempo of battle due to slow and lack of means. Real-time battlefield intelligence is often consolidated and various combat factors are weighed together to formulate a COA. Various factors including human error and emotional based decision making may also interfere with courses of action that would most relevantly serve mission accomplishment and success. Acceptable ranges of data and action milestones must be agreed upon in order for the success of the mission as well as an acceptable gains/loss factor. Significant human factors within operations is also methodically factored into ultimate decision making. Delivering battlefield intelligence directly from operator to COC has also been more difficult due to terrain, weather, lack of solid communication means as well as the ability to formulate broken or unreadable messages. It is therefore desirable to have improvements in the aggregating and displaying of tactical information to promote effectiveness of military and/or law enforcement operations.

SUMMARY

In one embodiment, there is provided a computer-implemented method for military planning, comprising: detecting a current geographical position; obtaining a destination geographical position; computing a plurality of travel routes to the destination geographical position; computing an attack probability for each travel route of the plurality of travel routes; organizing the plurality of travel routes into a list, wherein the list is sorted based on attack probability; and displaying the list on an electronic display.

In another embodiment, there is provided an electronic computing device, comprising: a processor; a memory coupled to the processor; a geolocation receiver; a camera; an electronic display; wherein the memory contains instructions, that when executed by the processor, perform the steps of: detecting a current geographical position; obtaining a destination geographical position; computing a plurality of travel routes to the destination geographical position; computing an attack probability for each travel route of the plurality of travel routes; organizing the plurality of travel routes into a list, wherein the list is sorted based on attack probability; and displaying the list on the electronic display.

In yet another embodiment, there is provided a computer program product for an electronic computing device comprising a computer readable storage medium having program instructions embodied therewith, the program instructions executable by a processor to cause the electronic computing device to: detect a current geographical position; obtain a destination geographical position; compute a plurality of travel routes to the destination geographical position; compute an attack probability for each travel route of the plurality of travel routes; organize the plurality of travel routes into a list, wherein the list is sorted based on attack probability; and display the list on an electronic display.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Disclosed embodiments provide systems and methods for aggregating and displaying tactical information. Multiple navigation routes between a starting location and ending location are computed. Each route is evaluated on a variety of criteria, and a ranked list is presented to a user. Additional information, such as rendering a geographically specific notification, display of a virtual range card, and/or information pertaining to an air support operation may also be rendered. Embodiments further enable issuing of air support requests via a tactile user interface. In this way, pertinent information is rendered in a timely manner to battlefield and commanding personnel to enable effective decision-making.

Figure 1:
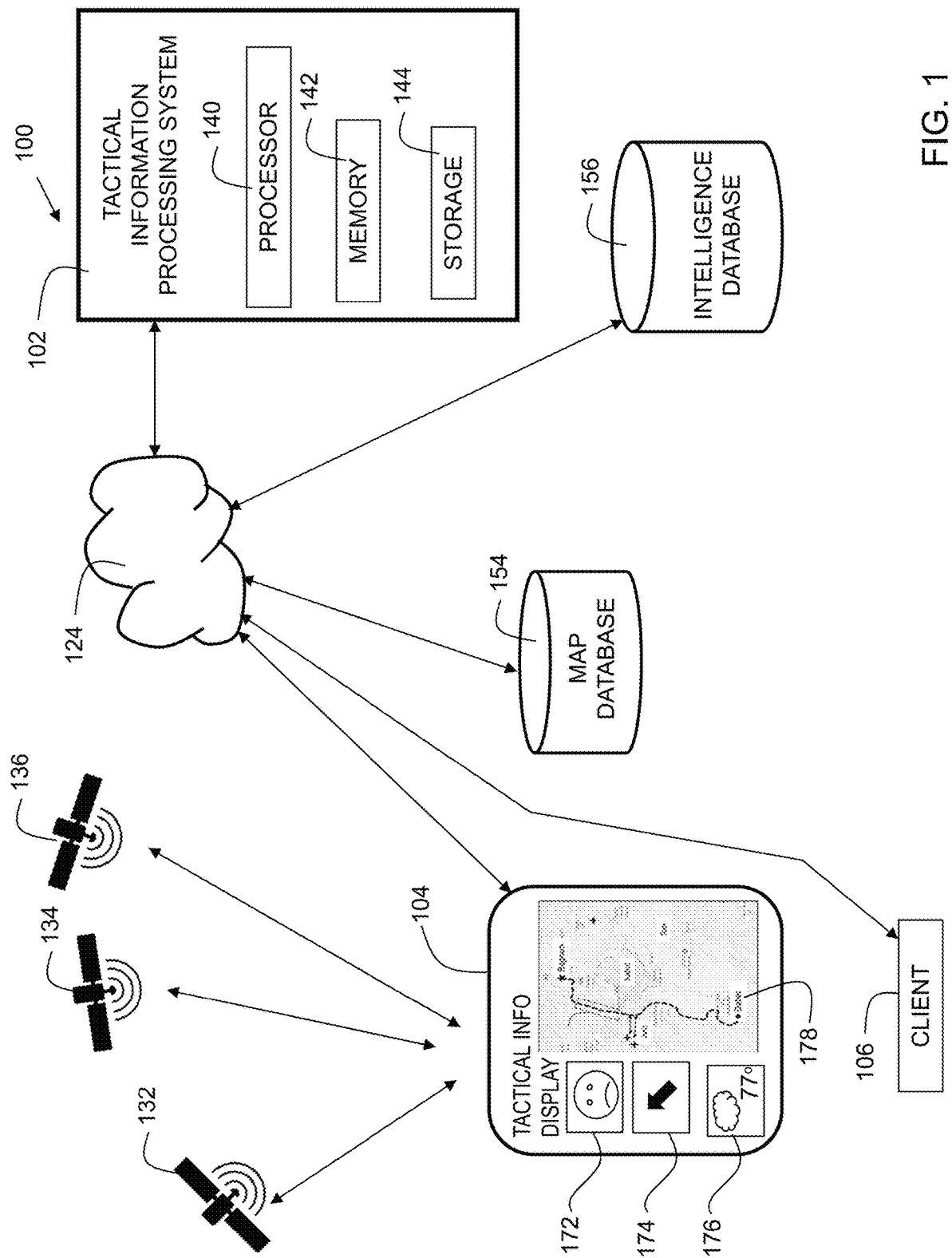
FIG. 1 shows a system in accordance with embodiments of the present invention.

FIG. 1 shows a system 100 in accordance with embodiments of the present invention. A tactical information processing computer system 102 has a processor 140, memory 142, and storage 144. Memory 142 includes instructions stored thereon, which when executed by the processor perform steps of the present invention. Memory 142 may include random-access memory (RAM), read-only memory (ROM), flash, or other suitable memory technology. In embodiments, memory 142 is a non-transitory computer readable medium. Storage 144 may include one or more magnetic hard disk drives, solid state disk drives, and/or other suitable storage devices.

Computer system 102 is in communication with network 124. Network 124 may be the Internet, a wide area network, a local area network, a private network, or other suitable network. One or more client devices, indicated as 104 and 106 may be in communication with computer system 102 via network 124. Clients 104 and 106 may be in communication with one or more satellites (indicated as 132, 134, and 136) for navigation (GPS) and/or communication purposes. Note that while three satellites are shown in FIG. 1, in practice, each client can be in simultaneous communication with more than three satellites during operation.

Embodiments may further include a map database 154. In embodiments, the map database 154 may include maps in raster, vector, or other formats. Maps may include elevation information, as well as manmade structures such as bridges, buildings, dams, and/or other structures. In some embodiments, the maps in map database 154 may be of a format including, but not limited to, ARDG (ARC Digitized Raster Graphics), GeoTIFF, ECRG (Enhanced Compressed ARC Raster Graphics), Shapefile, Vector Product Format, GeoJSON, Keyhole Markup Language, and/or Raster Product Format. Other suitable formats may also be utilized.

Embodiments may further include intelligence database 156. Intelligence database 156 may be implemented using a relational database such as an SQL (Structured Query Language Database), or other suitable database format. The intelligence database can include various information such as enemy locations, enemy troop size, enemy capabilities, weather information, friendly troop locations, air support information, naval support information, and/or other intelligence information.

In embodiments, the computer system 102 may implement an artificial intelligence scenario simulation process. The artificial intelligence (AI) scenario simulation process may execute on processor 140. The process may perform a combination of empirical analysis and machine learning techniques to provide recommendations to personnel via their client device.

The client devices may be implemented via a smartphone, tablet computer, or other suitable computing device. Examples of information rendered on the client device can include, but is not limited to, BOLO (Be on the lookout) information 172, which can include images of one or more person(s) that are on a wanted list. The information rendered may further include a recommended course heading 174. The information rendered may further include current and/or forecast weather information 176. The information rendered may further include a route map 178. This information is exemplary, and additional information can also be shown, as will be further described herein.

Figure 2:
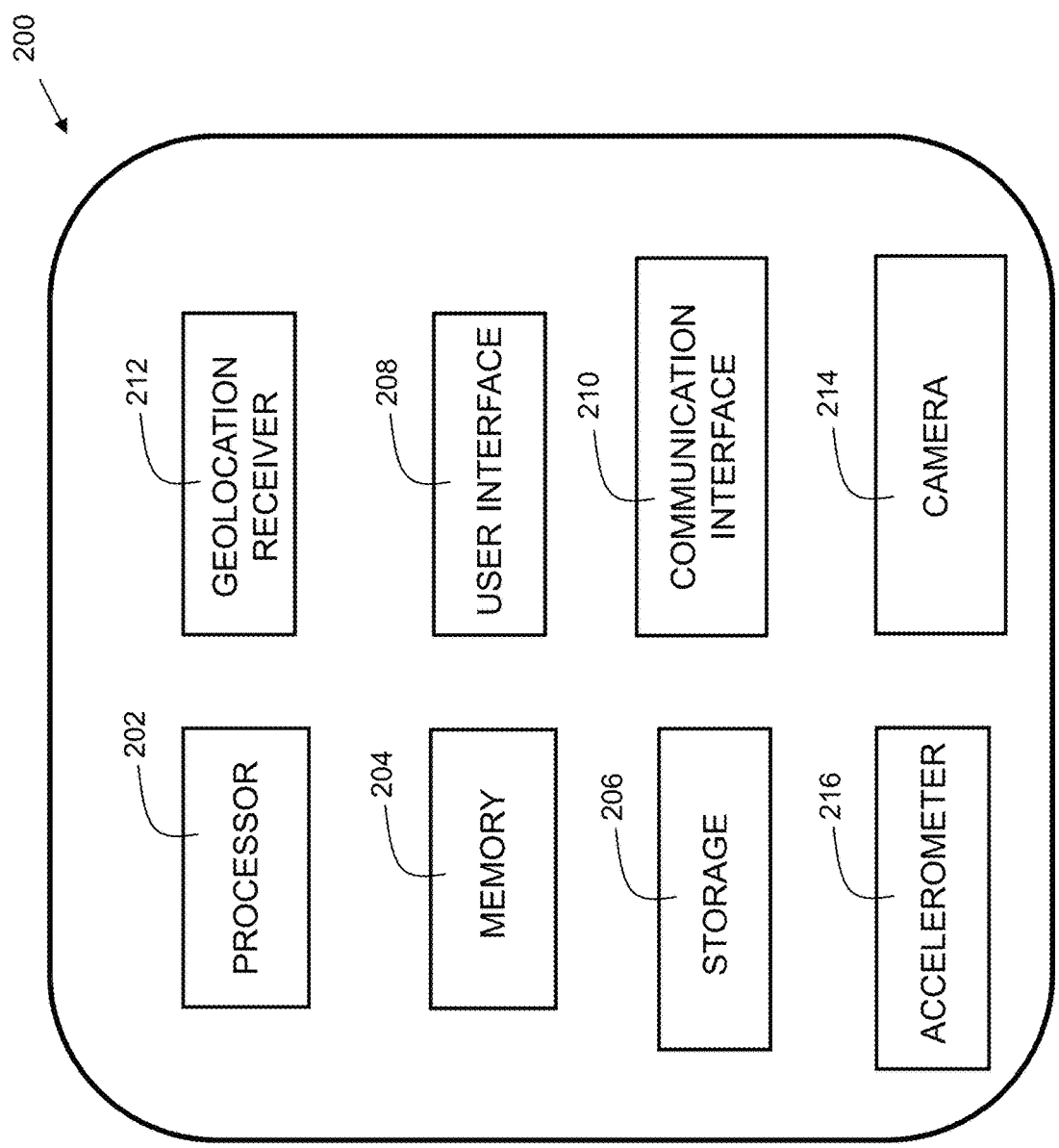
FIG. 2 is a block diagram of a device in accordance with embodiments of the present invention.

FIG. 2 is a block diagram of a device 200 in accordance with embodiments of the present invention. The client devices (104 and 106) of FIG. 1 may also be of a similar structure to device 200. Device 200 is an electronic computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may be a non-transitory computer readable medium. Memory 204 stores instructions, which when executed by the processor, implement the steps of the present invention.

Device 200 further includes storage 206. In embodiments, storage 206 may include one or more magnetic storage devices such as hard disk drives (HDDs). Storage 206 may additionally include one or more solid state drives (SSDs).

Device 200 further includes a user interface 208, examples of which include a liquid crystal display (LCD), a plasma display, a light emitting diode (LED) display, an organic LED (OLED) display, or other suitable display technology. The user interface 208 may further include a keyboard, mouse, or other suitable human interface device. In some embodiments, user interface 208 may be a touch screen, such as a capacitive or resistive touch screen.

The device 200 further includes a communication interface 210. The communication interface 210 may include a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 further includes geolocation receiver 212. The geolocation receiver can be for a global positioning system (GPS), GLONASS, Galileo, or other suitable system that enables geo-spatial position identification.

Device 200 may further include camera 214. The camera may be integral with the device as shown or connected thereto via a wired or wireless connection. The device 200 may further include an accelerometer 216, which can be used to track motion and/or determine orientation of the device 200.

In some embodiments, the device 200 may be ruggedized to resist dust and water and may further comprise a shock resistant case to enable the device 200 to survive drops and immersion in water. In some embodiments, the device 200 may include more, fewer, or different modules than those depicted in FIG. 2.

Figure 3B:
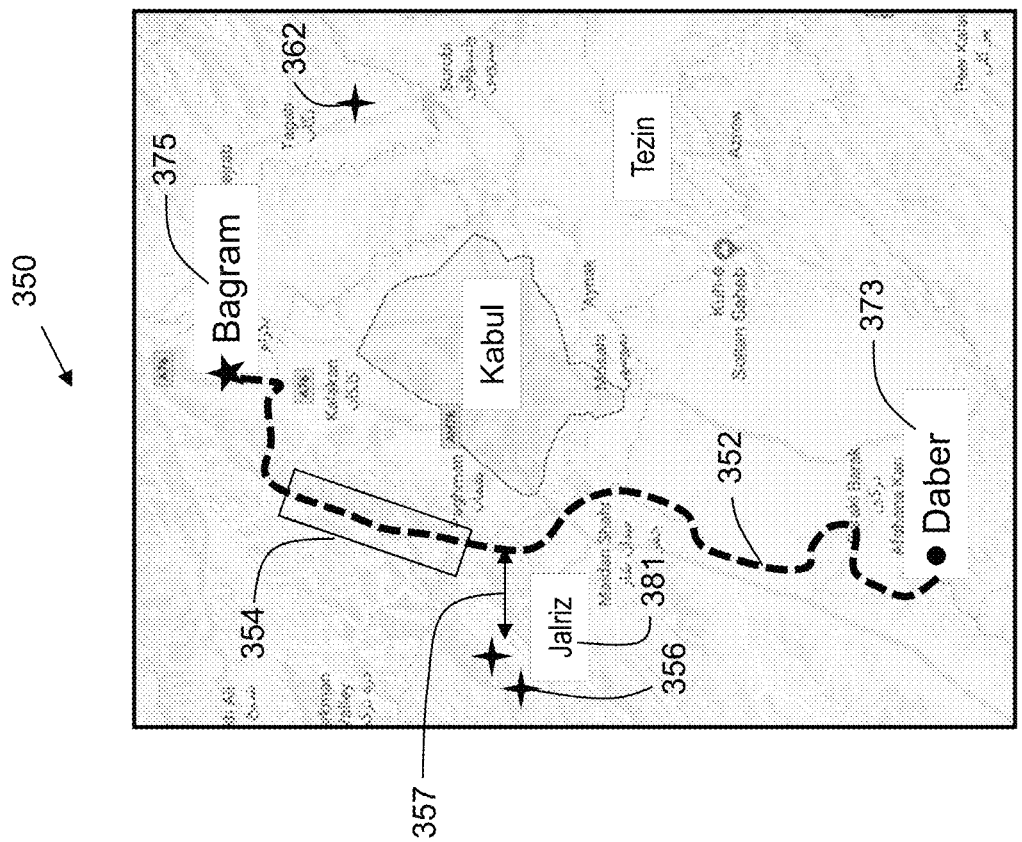
FIG. 3B shows a second route for evaluation in accordance with embodiments of the present invention.
Figure 3A:
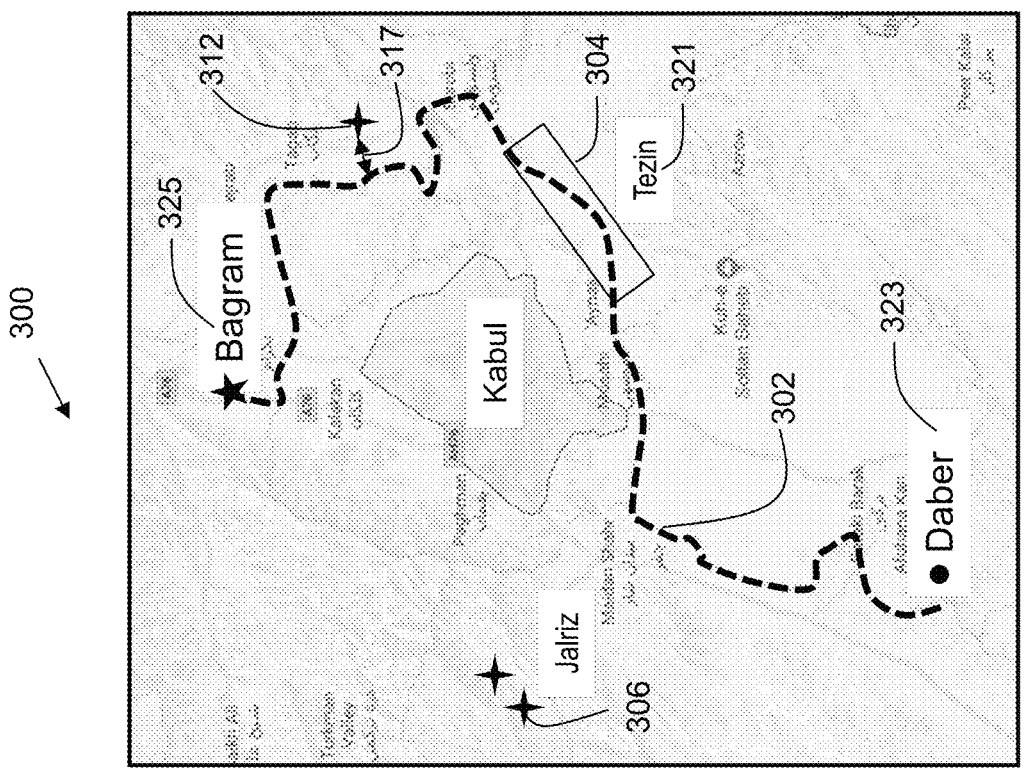
FIG. 3A shows a first route for evaluation in accordance with embodiments of the present invention.

FIG. 3A shows a map 300 indicating a first route 302 for evaluation in accordance with embodiments of the present invention. Route 302 originates at the location indicated as Daber 323 and terminates at the location indicated as Bagram 325. On map 300, enemy locations are indicated by four-point symbols such as 306 and 312. Route 302 passes near the location indicated as Tezin 321. A section of the route, indicated as 304, may be further analyzed and/or evaluated by system 102. In embodiments, each route may be divided into multiple sections, wherein each section is analyzed for various criteria as will be further described herein.

Referring now to FIG. 3B, it shows a map 350 indicating a second route 352 for evaluation in accordance with embodiments of the present invention. Route 352 originates at the location indicated as Daber 373 and terminates at the location indicated as Bagram 375. Thus, route 352 has the same origination point and termination point as route 302 of FIG. 3A. On map 350, enemy locations are indicated by four-point symbols such as 356 and 362. Route 352 passes near the location indicated as Jalriz 381. A section of the route, indicated as 354, may be further analyzed and/or evaluated by system 102. In embodiments, each route may be divided into multiple sections, wherein each section is analyzed for various criteria as will be further described herein.

As an example, a user located at Daber needs to go to Bagram. The user, using a device such as client 104 (FIG. 1) makes a request for a course of action recommendation to computer system 102. The computer system 102 may compute multiple routes based at least in part on map data from map database 154. The computer system 102 may then retrieve additional data from intelligence database 156. The additional data from intelligence database 156 can include, but is not limited to, enemy location, enemy numbers (number of troops, tanks, planes, etc. . . . ), enemy speed and heading, and a confidence level for the intelligence information. As an example, information that has been confirmed by a recent satellite image may be given a high confidence level, whereas information provided by an unreliable informant may be deemed to be at a low confidence level. In embodiments, the confidence level may be normalized on a scale from 1 to 100, with 100 indicating the highest confidence in the information.

In embodiments, the computer system 102 evaluates each route on one or more of the following conditions: distance, time required, attack probability, and/or an escape factor. In embodiments, the attack probability may further be based on a variety of criteria, including, but not limited to, a detectability factor, and a proximity to enemy positions, as well as the confidence level associated with each of the enemy positions.

In embodiments, each route is divided into segments, and each segment is analyzed individually. In some embodiments, each segment is of a fixed length (e.g. one kilometer). In other embodiments the segments may be of variable lengths. In embodiments, each segment is given a score S, as per the following formula:

$$S=(K_1-D)(K_2-T)(K_3-A)(K_4B)(K_5C)(K_6E)$$

Where:
D is the route distance
T is the estimated time to travel the route
A is a variable indicating the distance to an enemy location
B is a confidence level for the enemy location information
C is a detectability factor for the segment
E is an escape factor for the segment
And $K_1$-$K_5$ are constants.

In some embodiments, the user may enter ranking criteria as an input to the course of action recommendation process. The ranking criteria can include, but is not limited to, time, distance, detectability factor, and/or escape factor. This allows the user to prioritize the routes for a given objective. Based on the user input, one or more of the constants ($K_1$-$K_5$) are adjusted accordingly. As an example, if for a given mission, getting from Daber to Bagram as fast as possible is the top priority, then the constants are adjusted such that the time T is the dominant factor in evaluation of the segment. If instead, the primary objective is to arrive undetected, then the constants are adjusted such that the detectability factor C is the dominant factor in the evaluation of the segment.

The total route score Q is then computed as the sum of each segment of the route:

$$Q=\Sigma_{i=1}^{x} Si$$

Where x is the number of segments, and $S_i$ is the ith segment.

Each route is then ranked based on the total score Q, and the routes are presented in a ranked list for the user to select. In some embodiments, the routes may be normalized to a particular numerical range (e.g. 1-100). In some embodiments, the highest ranked route may be automatically selected by the computer system 102. The computer system 102 then sends the route information for the selected route to the user's device (e.g. 104).

Referring again to FIG. 3A, route 302 has segment 304, which is in an open desert area, resulting in a low detectability factor, since the user can be easily spotted in that area. Additionally, route 302 has a short distance 317 from enemy location 312. Similarly, referring again to FIG. 3B, route 352 has segment 354, which is in a dense mountainous area, resulting in a higher detectability factor, since the user can hide in caves and mountains in the area. However, the escape factor of that region may be low due to a limited number of possible escape routes. Additionally, route 352 has a longer distance 357 to enemy location 356 as compared with course distance 317 of route 302. These and other factors can be used in the ranking of the two routes.

Disclosed embodiments include a method for military planning, comprising: detecting a current geographical position; obtaining a destination geographical position; computing a plurality of travel routes to the destination position; computing an attack probability for each travel route of the plurality of travel routes; organizing the travel routes into a list, wherein the list is sorted based on attack probability; and displaying the list on an electronic display. In some embodiments, computing an attack probability for each travel route is based on an enemy location. Some embodiments include computing a detectability factor for each travel route; and further sorting the list based on the detectability factor. Some embodiments include computing an escape factor for each travel route; and further sorting the list based on the escape factor. Note that the aforementioned formulas and criteria are examples for an embodiment of the present invention, and other formulas and/or criteria may be used.

Additionally, an artificial intelligence (AI) and/or machine learning component may be utilized to further enhance the evaluation. In some embodiments, a machine learning construct such as a neural network may utilize supervised learning. In embodiments, this may be implemented on computer system 102. In such an embodiment, multiple routes for previous missions may be provided as input to the neural network, along with the actual results of user travel along the selected route. Outcomes of the travel, including travel times, ambushes, escapes, and/or other unforeseen circumstances are used in the training process. This can enable the neural network or other machine learning construct to identify patterns that may be imperceptible to human operators, allowing a greater level of success than with empirical methods alone.

Figure 4:
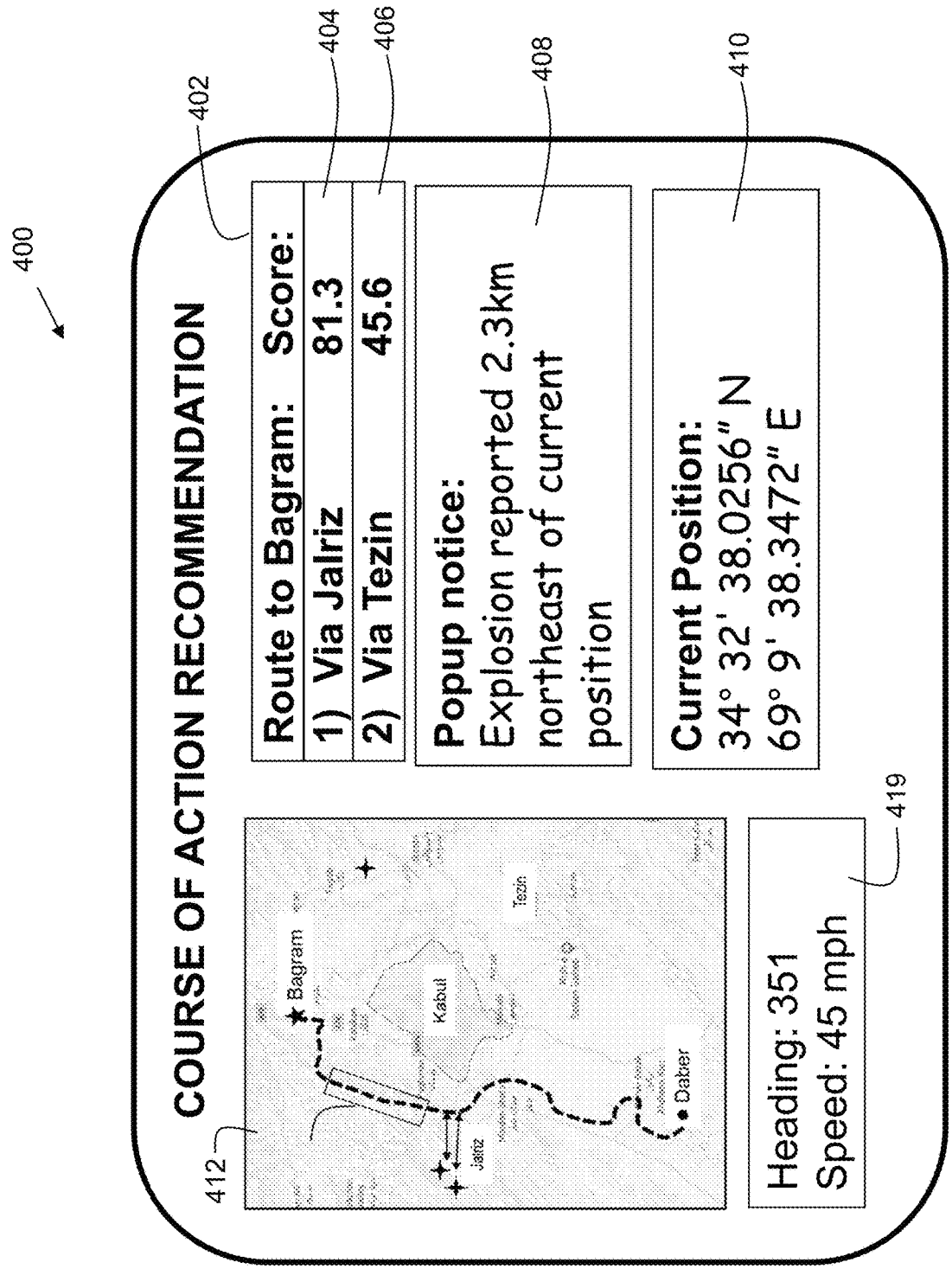
FIG. 4 shows a course of action recommendation in accordance with embodiments of the present invention.

FIG. 4 shows a course of action recommendation 400 in accordance with embodiments of the present invention. In embodiments, the course of action recommendation 400 may be rendered on an electronic display such as that of a tablet computer, smartphone, laptop computer, or other suitable computing device. Course of action recommendation 400 includes a route list 402, showing a list of possible routes. In row 404, route 1 is listed, corresponding to the route depicted in FIG. 3B. In row 406, route 2 is listed, corresponding to the route depicted in FIG. 3A. Based on the aforementioned parameters, formulas, and constants, the route of FIG. 3B is ranked higher than the route of FIG. 3A. The user can select a route (e.g. by touching, clicking, or other selection mechanism). The selected route is shown in map display 412. Additional information such as current position 410 and current heading and speed 419 may also be shown.

Additionally, one or more popup notices may also be displayed, such as shown at 408. A popup notice is a geographically specific notification. When the user's location (as indicated in 410) is a predetermined distance from a location associated with the popup notice, the notice is displayed on the display. Thus, embodiments can include retrieving a geographically specific notification, and rendering the notification on the display when a notification location is within a predetermined distance of the current geographical position. The notification location may be stored as metadata for a notification and may be stored in a latitude-longitude format, or other suitable format. This allows the user to focus on pertinent information without being distracted by notices for issues that are not immediately relevant to the user's current location.

Figure 5:
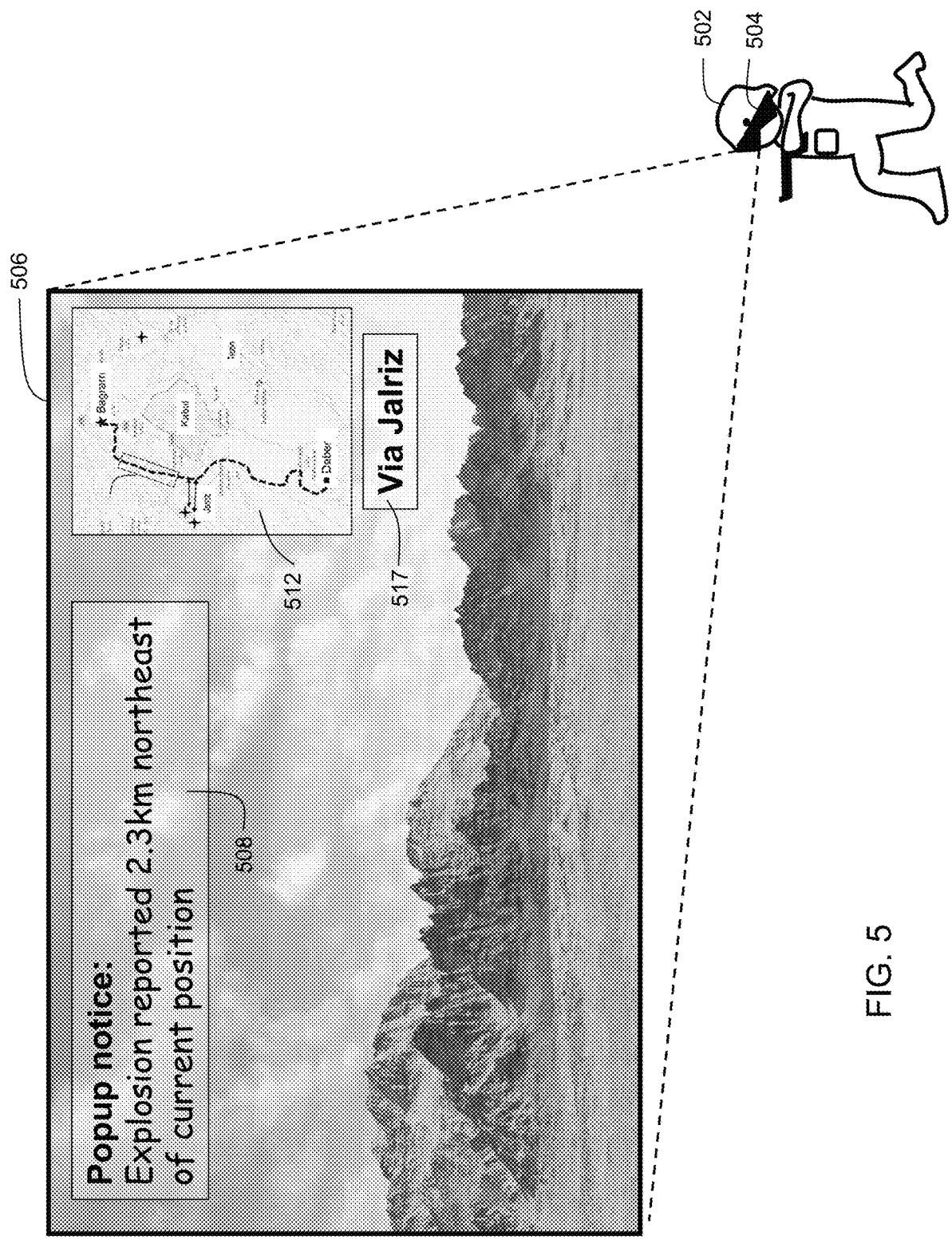
FIG. 5 shows a course of action recommendation in accordance with additional embodiments of the present invention.

FIG. 5 shows a course of action recommendation in accordance with additional embodiments of the present invention. The embodiment of FIG. 5 functions similar to that described for FIG. 4, but utilizing a heads-up display (HUD) device, rather than a tablet or laptop computer. In such an embodiment, a user 502 may utilize augmented reality goggles 504, or other HUD goggles to allow the user 502 to see pertinent information while still being able to observe his/her surroundings. In a user's field of view 506, a popup notification 508 is rendered, along with a route map 512, and a name indicator 517 for the selected route. In some embodiments, a level of transparency and/or translucency (alpha blending/compositing) may be utilized for the displayed items to minimize the amount of obfuscation of the user's field of view.

In embodiments, the goggles 504 may utilize an optical combiner, such as a polarized beam combiner, and/or an off-axis combiner. Some embodiments may utilize a waveguide grating or waveguide hologram to extract a collimated image guided by total internal reflection (TIR) in a waveguide pipe. Any suitable projection and/or image combining technique may be used.

Figure 6A:
FIG. 6A and FIG. 6B show an example of close air support in accordance with embodiments of the present invention.
Figure 6B:
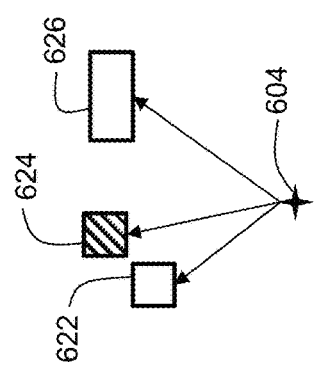

FIG. 6A and FIG. 6B show an example of close air support in accordance with embodiments of the present invention. In such an embodiment, a user can perform requests for close air support, which can then be integrated into the tactical information display for the user. This enables a user to both request and monitor the status of close air support requests. Referring now specifically to FIG. 6A, a scene 602 of a city is shown, indicating a plurality of structures, including building 622, building 624, and building 626. A user orients his/her tablet computing device 604 such that an image of the scene 602 is rendered on the display as 606, as acquired from a front facing camera (e.g. provided by 214 of FIG. 2). To request close air support, a user presses, taps, or otherwise selects the desired structure (e.g. 624). In this embodiment, the user presses a touchscreen at location 608 to select the building. The location of the building is then communicated in a message to a remote computing device via a communications network. The message can include additional information about the selected target (e.g. building 624), such as a type of operation (e.g. surveillance, demolition, etc.). In the case of demolition (e.g. requesting a building to be bombed by an aircraft or drone), the user may optionally receive a warning notification 610 if the user's current location is within a predetermined distance (e.g. 600 meters) from the selected target. This can provide warning to the user to move to a greater distance from the target for safety purposes.

Embodiments can include rendering a scene on the electronic display; receiving an area designation on the rendered scene; and transmitting the area designation to a remote computing device via a communications network. Embodiments can further include computing a distance between the area designation and the current geographical position; and rendering a notification on the display in response to the computed distance being below a predetermined threshold. Embodiments can further include periodically recomputing the distance between the area designation and the current geographical position; and transmitting the recomputed distance to the remote computing device via a communications network. This can provide an indication to aircraft personnel when the user has cleared the area to a safe distance such that the target can be demolished without undue risk to the user. In some embodiments, instead of a scene rendering, a map may be rendered on the electronic display, and the user selects an area of the map for close air support. Thus, embodiments can include rendering a map on the electronic display; receiving an area designation on the rendered map; and transmitting the area designation to a remote computing device via a communications network. The transmitted area is then used as coordinates to direct surveillance, bombs, firefighting, medical evacuation, or other air support activities as appropriate.

FIG. 6B shows a top-down schematic of the scenario depicted in FIG. 6A. The location of the user device is indicated at 604. The buildings 622, 624, and 626 are indicated accordingly in FIG. 6B. The device (e.g. 200 of FIG. 2) may utilize a forward-facing camera to determine a distance and heading from the location of device 604. The distance and heading from the location of device 604 to building 624, along with the current location of device 604, can be used to derive absolute coordinates (e.g. latitude and longitude) of building 624. These coordinates can then be used to direct close air support for the designated action (e.g. surveillance, demolition, etc.). In some embodiments, the device (e.g. 200 of FIG. 2) may further include other ranging and direction equipment such as lidar, radar, and/or other suitable mechanisms instead of, or in addition to, the camera system.

Figure 7:
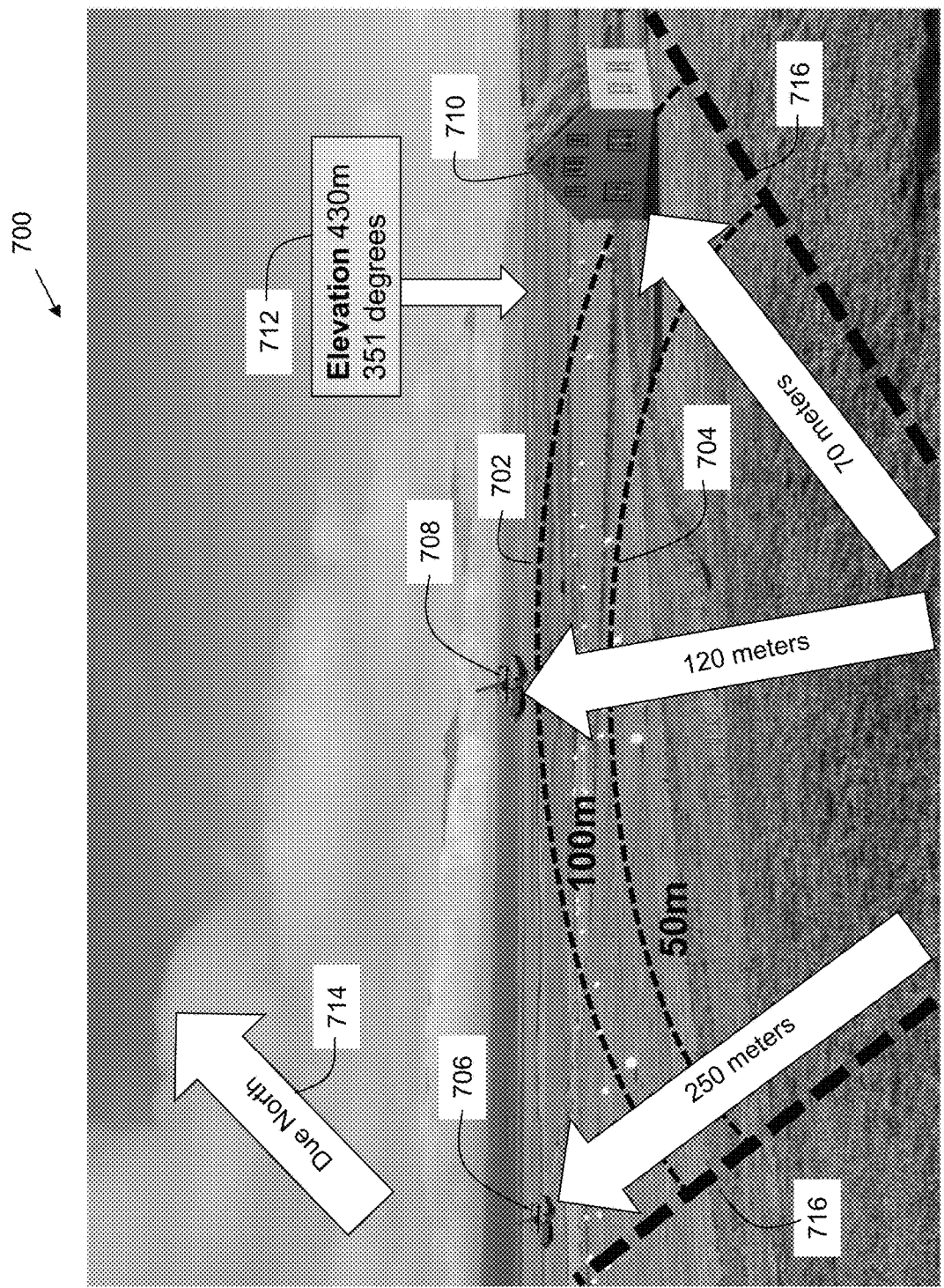
FIG. 7 shows an example of a virtual range card in accordance with embodiments of the present invention.

FIG. 7 shows an example of a virtual range card 700 in accordance with embodiments of the present invention. In such an embodiment, using the camera and geolocation system of the device 200, an annotated virtual range card is created. The virtual range card (VRC) indicates distances to important objects within a scene. The scene may include a panoramic image. Additionally, distance arcs 702 and 704 may be overlaid on the scene and can be used to assess approximate distances from a given vantage point. In the example shown, distance arc 702 represents 100 meters, and distance arc 704 represents 50 meters. Utilizing automatic ranging from a camera, lidar, radar, or other suitable mechanism, distances to important objects within the scene are identified and rendered on an electronic display. In the example shown, tank 706 is indicated at a distance of 250 meters, tank 708 is indicated at a distance of 120 meters and building 710 is indicated at a distance of 70 meters. Additionally, elevation information may be automatically computed and annotated for one or more scene elements, such as indicated by elevation indication 712. A directional indication 714 may also be rendered on the VRC 700, based on information from geolocation receiver (212 of FIG. 2), a magnetic compass, gyroscopic compass, or other suitable position/orientation system. A fire field represented by the area between lines 716 may also be rendered, which may indicate an assigned sector of fire with recognizable targets.

Embodiments can include acquiring a panoramic image; displaying the panoramic image on an electronic display; generating one or more range arcs; and rendering the one or more range arcs on the electronic display overlaid on the panoramic image. Embodiments can further include rendering a fire field on the electronic display. Embodiments can further include rendering a directional indication on the electronic display. The virtual range card (VRC) of disclosed embodiments can be electronically transmitted, so it can easily be shared with other personnel involved in a mission. In embodiments, the panoramic image can include at least 120 degrees of view for a given scene.

Mobile applications used in the tradition infantry setting have the added burden of application development that mirrors the TT&P (Tactics, Training and Procedure) it embodies. The VRC application takes the concept of a coordinated fire plan sketch and virtualizes it using a mobile handheld device. It enables the operation leadership personnel to enhance squad maneuvers and fighting elements, while synchronizes the efforts of those squads. Disclosed embodiments aide in the controls and emplacement of key weapon systems and corresponding logistical needs. Disclosed embodiments also enable accurate and timely reports and enable replicating them amongst relative higher echelons of command. This provides guidance to leadership on where to place personnel in order to accomplish the mission, while maintaining a tactical posture.

The virtual range card (VRC) also assists in assigning clear tasks and purposes to the squad. The end state being a small unit leader with a greater understanding of the mission and commander's intent two levels up (the company and battalion) through situational understanding. For senior enlisted leadership, VRC assists in supervising pre-combat checks and inspections, as well as provides other operational and planning advantages.

Figure 8:
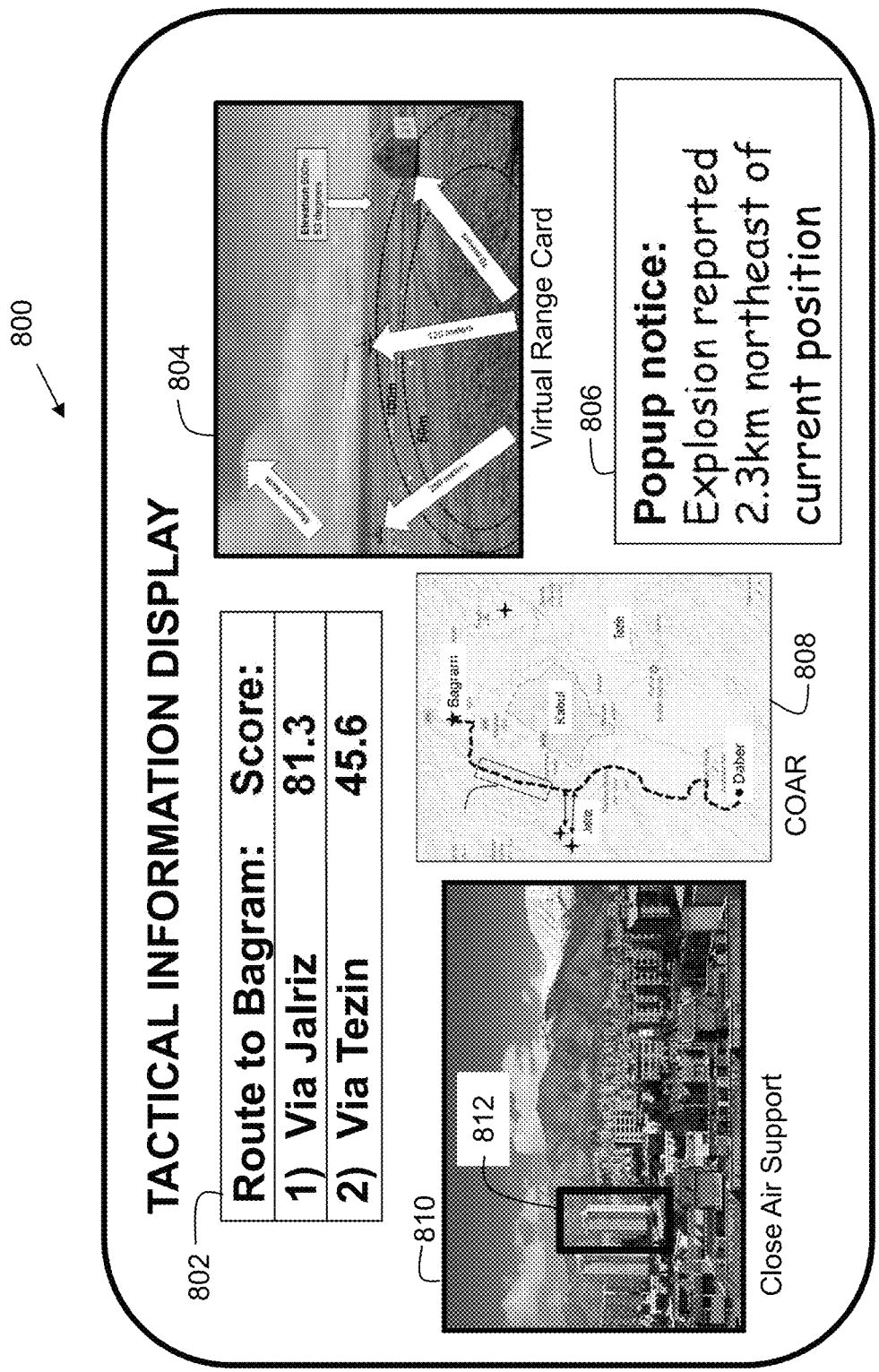
FIG. 8 shows a tactical information display in accordance with additional embodiments of the present invention.

FIG. 8 shows a tactical information display 800 in accordance with additional embodiments of the present invention. Tactical information display 800 includes a route list 802, showing a list of possible routes. Tactical information display 800 may further include a virtual range card 804, displaying important information from a particular vantage point. Tactical information display 800 may further include a popup notice 806. Tactical information display 800 may further include a course of action recommendation (COAR) map 808. Tactical information display 800 may further include a close air support display 810, which may further include an indication 812 of a building or other object for which close air support is requested. The indication 812 can include a highlighted area around the building/object, or other suitable indication. Thus, the tactical information display 800 provides an aggregation of important tactical information utilized in mission planning and/or execution.

Figure 9:
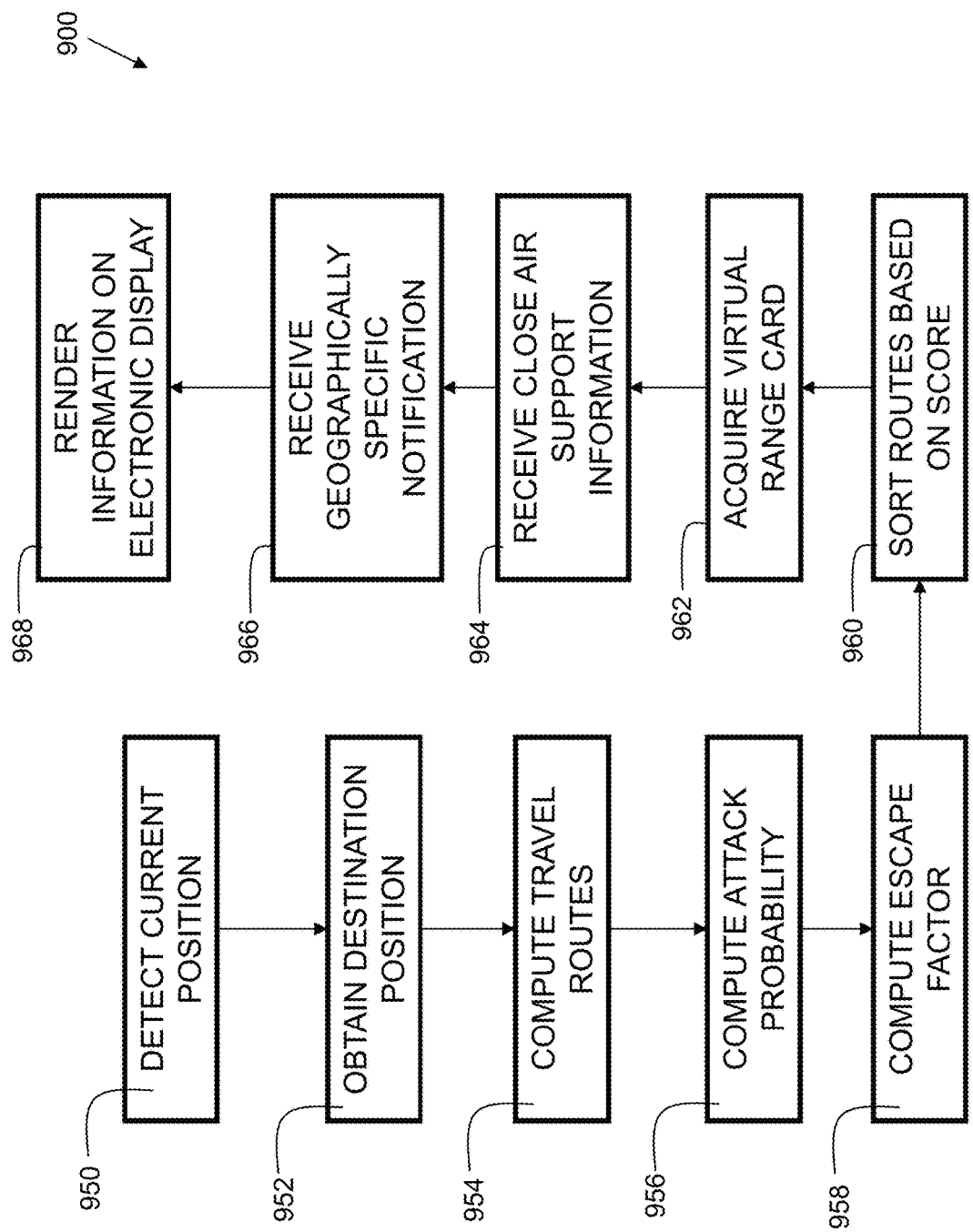
FIG. 9 is a flowchart indicating process steps for embodiments of the present invention.

FIG. 9 is a flowchart 900 indicating process steps for embodiments of the present invention. In process step 950, a current position is detected. This may be accomplished through a satellite navigation system such as GPS, a land-based system such as LORAN-C, or other suitable navigation system. At process step 952 a destination position is obtained. At process stop 954, a plurality of travel routes is computed (e.g. travel route 302 of FIG. 3A and travel route 352 of FIG. 3B). In process step 956, an attack probability is computed. In embodiments, this is computed based on a number of enemies, the proximity of the enemies to the route, the confidence level of the information regarding the enemies, and/or other suitable criteria. In process step 958, an escape factor is computed. This may be computed based on the number of possible escape routes and/or hiding areas along the route. In process step 960, the routes are sorted based on the score, such as indicated in 402 of FIG. 4. In process step 962, a virtual range card is acquired, such as indicated at 804 of FIG. 8. In process step 964, close air support information is received, such as 810 of FIG. 8. In process step 966, a geographically specific notification is received, such as 806 of FIG. 8. In process step 968, the information is rendered on an electronic display, such as is depicted in FIG. 8.

As can now be appreciated, disclosed embodiments provide improved acquisition and dissemination of tactical information that can be used for supporting the planning, execution, and/or monitoring of military and/or law enforcement operations. In some embodiments machine learning is used to further enhance the analysis of intelligence data. Some embodiments may utilize a supervised learning model. Analyzing and identifying the kinds of combat variables, intelligence sources as well as relevancy to the mission is the critical component that facilitates the commander's course of action (COA). Compilation of combat variables are sourced from subject matter experts (SME)s, DoD institutions, combat instructors, combat operators, commanders with combat experience, and/or historical data. Vast amounts of combat variables, empirical data, historical data, and miscellaneous factors, actionable intelligence and available and known courses of action (COA) are formulated to a hybrid or ensemble formula to produce a logical and mission success oriented "recommended" course of action. Crowd-sourcing streams of intelligence via handheld device along with actionable and real-time battlefield intelligence is a practical way of keeping up to speed in a complex battlefield. SMEs may advise and provide guidance as to what a reasonable and prudent commander would consider to be a judicious threshold for gains/losses sustained during actual operations, which can serve as the litmus or control. Acceptable ranges of gains/loss "milestones" are examined by SMEs, agreed upon and subsequently established. Blue Force Tracker, handheld mobile devices, 4G/5G network, as well as satellite communication radios (drop in and drop out network) may be utilized in some embodiments. The command level platform may be implemented in a desktop format that provides the capability of receiving data by mobile platforms as well as manual data entry. The significance of disclosed embodiments is that they facilitate more consensus building amongst commanders for decision making as well as immediate actions and/or preparations by other elements within the support sections. This enables the possibility of more effective operations with higher success rates, reduced casualties, and reduced financial costs.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method for military planning, comprising:
   detecting a current geographical position;
   obtaining a destination geographical position;
   computing a plurality of travel routes to the destination geographical position;
   computing an attack probability for each travel route of the plurality of travel routes;
   organizing the plurality of travel routes into a list, wherein the list is sorted based on attack probability; and
   displaying the list on an electronic display; and further comprising: acquiring a panoramic image, wherein the one or more range arcs are bounded by a first straight line and a second straight line, wherein the first straight line and second straight line extend beyond the one or more range arcs;
   displaying the panoramic image on an electronic display;
   generating one or more range arcs;
   rendering the one or more range arcs on the electronic display overlaid on the panoramic image; and
   rendering a fire field on the electronic display, wherein the fire field is defined by an area between two lines, which represents an assigned sector of fire with recognizable targets;
   rendering a scene on the electronic display;
   receiving as an area designation, a selection of a structure on the rendered scene; and
   transmitting the location of the area designation to a remote computing device via a communications network;
   issuing a bombing request for the selected structure
   computing a distance between the area designation and the current geographical position;
   rendering a notification on the electronic display for the user to increase the distance between the area designation and the current geographical position, in response to the bombing request and to the computed distance being below a predetermined threshold; and
   wherein displaying the list on an electronic display comprises displaying the list on a heads-up display (HUD) device.

2. The method of claim 1, wherein computing an attack probability for each travel route is based on an enemy location.

3. The method of claim 2, further comprising:
   computing a detectability factor for each travel route; and
   further sorting the list based on the detectability factor.

4. The method of claim 3, further comprising:
   computing an escape factor for each travel route; and
   further sorting the list based on the escape factor.

5. The method of claim 1, further comprising rendering a directional indication on the electronic display.

6. The method of claim 1, further comprising:
   periodically recomputing the distance between the area designation and the current geographical position; and
   transmitting the recomputed distance to the remote computing device via a communications network.

7. The method of claim 1, further comprising:
   retrieving a geographically specific notification, and rendering the geographically specific notification on the electronic display when a notification location is within a predetermined distance of the current geographical position.

8. An electronic computing device, comprising:
   a processor;
   a memory coupled to the processor;
   a geolocation receiver;
   a camera;
   an electronic display;
   wherein the memory contains instructions, that when executed by the processor, perform the steps of:
   detecting a current geographical position;
   obtaining a destination geographical position;
   computing a plurality of travel routes to the destination geographical position;
   computing an attack probability for each travel route of the plurality of travel routes;
   organizing the plurality of travel routes into a list, wherein the list is sorted based on attack probability; and
   displaying the list on the electronic display;
   acquiring a panoramic image, wherein the one or more range arcs are bounded by a first straight line and a second straight line, wherein the first straight line and second straight line extend beyond the one or more range arcs;
   displaying the panoramic image on an electronic display;
   generating one or more range arcs;
   rendering the one or more range arcs on the electronic display overlaid on the panoramic image; and
   rendering a fire field on the electronic display, wherein the fire field is defined by an area between two lines, which represents an assigned sector of fire with recognizable targets;
   rendering a scene on the electronic display;
   receiving as an area designation, a selection of a structure on the rendered scene; and transmitting the location of the area designation to a remote computing device via a communications network;
   issuing a bombing request for the selected structure
   computing a distance between the area designation and the current geographical position;
   rendering a notification on the electronic display for the user to increase the distance between the area designation and the current geographical position, in response to the bombing request and to the computed distance being below a predetermined threshold; and
   wherein displaying the list on an electronic display comprises displaying the list on a heads-up display (HUD) device.

9. The device of claim 8, wherein the memory further includes instructions, that when executed by the processor, perform the step of computing an attack probability for each travel route based on an enemy location.

10. The device of claim 9, wherein the memory further includes instructions, that when executed by the processor, perform the steps of:
    computing a detectability factor for each travel route; and
    further sorting the list based on the detectability factor.

11. The device of claim 10, wherein the memory further includes instructions, that when executed by the processor, perform the steps of:
    computing an escape factor for each travel route; and
    further sorting the list based on the escape factor.

12. A computer program product for an electronic computing device comprising a computer readable storage medium having program instructions embodied therewith, the program instructions executable by a processor to cause the electronic computing device to:
  detect a current geographical position;
  obtain a destination geographical position;
  compute a plurality of travel routes to the destination geographical position;
  compute an attack probability for each travel route of the plurality of travel routes;
  organize the plurality of travel routes into a list, wherein the list is sorted based on attack probability; and
  display the list on an electronic display;
  acquiring a panoramic image, wherein the one or more range arcs are bounded by a first straight line and a second straight line, wherein the first straight line and second straight line extend beyond the one or more range arcs;
  displaying the panoramic image on an electronic display;
  generating one or more range arcs;
  rendering the one or more range arcs on the electronic display overlaid on the panoramic image; and
  rendering a fire field on the electronic display, wherein the fire field is defined by an area between two lines, which represents an assigned sector of fire with recognizable targets;
  rendering a scene on the electronic display;
  receiving as an area designation, a selection of a structure on the rendered scene; and
  transmitting the location of the area designation to a remote computing device via a communications network;
  issuing a bombing request for the selected structure
  computing a distance between the area designation and the current geographical position;
  rendering a notification on the electronic display for the user to increase the distance between the area designation and the current geographical position, in response to the bombing request and to the computed distance being below a predetermined threshold; and
  wherein displaying the list on an electronic display comprises displaying the list on a heads-up display (HUD) device.

13. The computer program product of claim 12, wherein the computer readable storage medium includes program instructions executable by the processor to cause the electronic computing device to:
  compute a detectability factor for each travel route; and
  further sort the list based on the detectability factor.

14. The computer program product of claim 13, wherein the computer readable storage medium includes program instructions executable by the processor to cause the electronic computing device to:
  compute an escape factor for each travel route; and
  further sort the list based on the escape factor.

15. The computer program product of claim 12, wherein the computer readable storage medium includes program instructions executable by the processor to cause the electronic computing device to:
  render a map on the electronic display;
  receive an area designation on the rendered map; and
  transmit the area designation to a remote computing device via a communications network.

* * * * *